US011980799B2

(12) United States Patent
Mansson et al.

(10) Patent No.: US 11,980,799 B2
(45) Date of Patent: May 14, 2024

(54) SYSTEMS AND METHODS FOR TESTING A BICYCLE TRAINING APPARATUS

(71) Applicant: Purdue Research Foundation, West Lafayette, IN (US)

(72) Inventors: Jan-Anders Mansson, West Lafayette, IN (US); Teal Francis Dowd, Lafayette, IN (US); Diana Gabrielle Heflin, San Diego, CA (US); Justin Douglas Miller, Columbus, OH (US); Jacob Dean Coffing, Williamsport, IN (US); Wim Sweldens, Summit, NJ (US)

(73) Assignee: Purdue Research Foundation, West Lafayette, IN (US)

( * ) Notice: Subject to any disclaimer, the term of this patent is extended or adjusted under 35 U.S.C. 154(b) by 297 days.

(21) Appl. No.: 17/544,760

(22) Filed: Dec. 7, 2021

(65) Prior Publication Data

US 2022/0176221 A1   Jun. 9, 2022

Related U.S. Application Data

(60) Provisional application No. 63/122,449, filed on Dec. 7, 2020.

(51) Int. Cl.
*A63B 69/16* (2006.01)
*B62M 6/50* (2010.01)

(52) U.S. Cl.
CPC .............. *A63B 69/16* (2013.01); *B62M 6/50* (2013.01); *A63B 2225/02* (2013.01)

(58) Field of Classification Search
CPC ...... A63B 69/16; A63B 2225/02; B62M 6/50; G01L 3/242; G01L 3/26; G01L 25/003
See application file for complete search history.

(56) References Cited

U.S. PATENT DOCUMENTS

| 2012/0322621 | A1* | 12/2012 | Bingham, Jr. ..... A63B 21/0088 482/8 |
| 2019/0346320 | A1* | 11/2019 | Smits ..................... A63B 69/16 |
| 2020/0345314 | A1* | 11/2020 | Fedewa ................ A61B 5/0537 |

\* cited by examiner

*Primary Examiner* — Andrew S Lo
(74) *Attorney, Agent, or Firm* — Hartman Global IP Law; Gary M. Hartman; Domenica N. S. Hartman

(57) ABSTRACT

Systems and methods for testing the accuracy of a bicycle training apparatus that is configured to measure the power output of a cyclist riding on a bicycle. The system includes a base, a main drive shaft secured to the base, a motor secured to the base and configured to rotate the main drive shaft, torque and rotational speed sensors configured to measure the torque and rotational speed of the main drive shaft during rotation thereof. The bicycle training apparatus may be secured relative to the base and functionally coupled to the main drive shaft. The motor may then be operated to apply a power input to the bicycle training apparatus while measuring the torque and rotational speed of the main drive shaft and the power input with the bicycle training apparatus. The resulting measurements may be compared to determine the accuracy of the bicycle training apparatus.

20 Claims, 8 Drawing Sheets

SYSTEMS AND METHODS FOR TESTING A BICYCLE TRAINING APPARATUS

CROSS REFERENCE TO RELATED APPLICATIONS

This application claims the benefit of U.S. Provisional Application No. 63/122,449, filed Dec. 7, 2020, the contents of which are incorporated herein by reference.

BACKGROUND OF THE INVENTION

The present invention generally relates to virtual cycling. The invention particularly relates to systems and methods for testing the accuracy of a bicycle training apparatus that is configured to measure the power output of a cyclist riding on a bicycle.

Recently, virtual cycling has become widely adopted as a viable remote competition platform for athletes to compete. Similar to real-world bicycle racing, virtual cycling involves cyclists racing against each other. However, in virtual cycling the cyclists may be located in different locations, such as their homes, and compete against one another with virtual avatars in a variety of virtual worlds.

The cyclists use a conventional bicycle in combination with a stationary bicycle training apparatus that maintains the position of the bicycle and measures power output as the cyclist pedals the bicycle. These measurements are transmitted to a computing device (as nonlimiting examples, computer, smart phone, etc.) and a virtual cycling program operating thereon. Such a program typically receives the cyclist's power output and divides it by the cyclist's weight to produce a "watts per kilo" (WPK) number. The higher a rider's WPK, the faster their onscreen virtual avatar will travel in the virtual world.

Various types of bicycle training apparatuses are commercially available that are compatible with virtual cycling programs including direct-drive trainers, roller trainers, and friction trainers. For direct-drive trainers, the rear (driven) wheel of a bicycle is removed and the direct-drive trainer is directly coupled with the frame and functionally coupled to the chain of the bicycle that would ordinarily drive the rear wheel. Pedaling the bicycle causes the components of the direct-drive trainer to rotate via the chain. For roller trainers, the rear wheel of a bicycle is positioned on rolling members of the roller trainer such that the bicycle may be ridden in an unmodified condition. Pedaling the bicycle causes rotation of a rolling member in contact with the rear wheel of the bicycle. Friction trainers have a frame that is clamped to rear dropouts of a bicycle to maintain the position of the bicycle, and a roller is placed in contact with the rear wheel of the bicycle. Pedaling the bicycle causes rotation of the roller due to rotation of the rear wheel of the bicycle. Additional features of bicycle training apparatuses may include automatic resistance adjustment, slope change, etc., that promote a riding experience intended to match the environment depicted in the virtual world being displayed.

To promote the fairness of virtual races, specific models or brands of bicycle training apparatuses should not give individual cyclists a distinct advantage or disadvantage. To this end, accurate power measurement and resistance control performed by a bicycle training apparatus are critical to ensure fairness among the competing athletes. However, bicycle training apparatuses currently available may vary in numerous manners, including the aforementioned power measurement and resistance control. Therefore, it can be appreciated that it would be desirable if systems and/or methods were available for certification/homologation of bicycle training apparatuses and related software to ensure the integrity of the sport.

BRIEF DESCRIPTION OF THE INVENTION

The present invention provides systems and methods suitable for testing the accuracy of a bicycle training apparatus that is configured to measure the power output of a cyclist riding on a bicycle that is being operated in combination with the bicycle training apparatus.

According to one nonlimiting aspect of the invention, such a system includes a base, a main drive shaft secured to the base, a motor secured to the base and configured to rotate the main drive shaft, a torque sensor configured to measure the torque applied to the main drive shaft during rotation thereof, and a rotational speed sensor configured to measure the rotational speed of the main drive shaft during rotation thereof. The system is configured for securing the bicycle training apparatus relative to the base, and configured for coupling the main drive shaft to a hub of the bicycle training apparatus or a hub of a bicycle wheel in contact with the bicycle training apparatus.

According to another nonlimiting aspect of the invention, a method is provided that includes locating a bicycle training apparatus on a base of a system, securing the bicycle training apparatus relative to the base, coupling a main drive shaft of the base to a hub of the bicycle training apparatus or a hub of a bicycle wheel in contact with the bicycle training apparatus, operating a motor of the system to rotate the main drive shaft and apply a power input to the bicycle training apparatus in response to rotation of the main drive shaft, continuously measuring the torque and rotational speed of the main drive shaft with sensors of the system and storing the resulting measurements as a first data set, measuring the power input with the bicycle training apparatus and storing the resulting measurements as a second data set, and comparing the first data set and the second data set to determine the accuracy of the bicycle training apparatus.

Technical effects of systems and methods as described above preferably include the capability of testing the accuracy of a bicycle training apparatus that is configured to measure the power output of a cyclist riding on a bicycle.

Other aspects and advantages of this invention will be appreciated from the following detailed description.

DETAILED DESCRIPTION OF THE INVENTION

Figure 1:
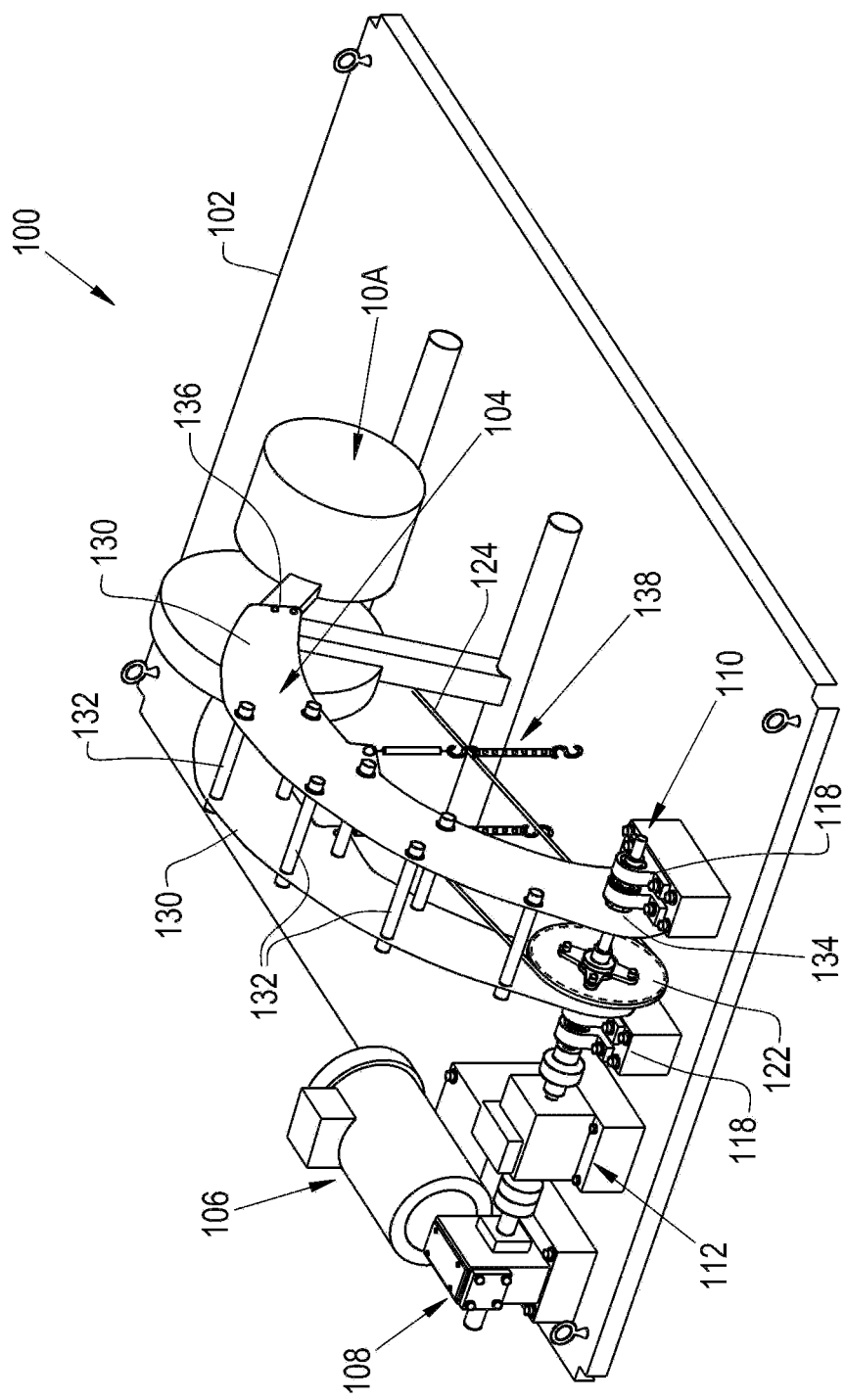
FIGS. 1 and 2 represent a first embodiment of a system for testing the accuracy of a first bicycle training apparatus coupled thereto in accordance with certain nonlimiting aspects of the invention.

The intended purpose of the following detailed description of the invention and the phraseology and terminology employed therein is to describe what is shown in the drawings, which include the depiction of one or more nonlimiting embodiments of the invention, and to describe certain but not all aspects of the depicted embodiment(s). The following detailed description also describes certain investigations relating to the depicted embodiment(s), and identifies certain but not all alternatives of the depicted embodiment(s). Therefore, the appended claims, and not the detailed description, are intended to particularly point out subject matter regarded as the invention, including certain but not necessarily all of the aspects and alternatives described in the detailed description.

Disclosed herein are systems and methods for testing and verifying one or more types of bicycle training apparatuses, such as those capable of use for virtual cycling races. The systems may be used for certification/homologation of bicycle training apparatuses and related software. Verification with the system may reduce the likelihood that specific models or brands of bicycle training apparatuses give cyclists an advantage or disadvantage during competitive races by ensuring that all bicycle training apparatuses involved in the races function within predefined criteria.

The systems may be used to perform an accuracy verification test to determine the accuracy of measurements of a cyclist's output power performed by a bicycle training apparatus. The system may be connected to the bicycle training apparatus to be tested such that the system may impart a predetermined power input to the bicycle training apparatus that can be controlled in terms of torque and rotational speed, typically but not necessarily revolutions per minute (rpm). During the test, the system acts as a "virtual cyclist" that applies the predetermined power input to the bicycle training apparatus and the connected bicycle training apparatus measures the power input. The system may compare the load delivered therefrom and the load measured by the bicycle training apparatus. Any discrepancies between the actual power input and the power recorded by the bicycle training apparatus may be determined and considered as errors in the accuracy of the measurements performed by the bicycle training apparatus.

FIGS. 1 through 8 represent nonlimiting embodiments of the system, referred to hereinafter as the system 100. FIGS. 1 through 4 represent the system 100 as functionally connected to bicycle training apparatuses 10A (FIG. 1), 10B (FIG. 3), and 10C (FIG. 4) for testing thereof. The bicycle training apparatuses 10A and 10B schematically represented in FIGS. 1 and 3 will be referred to herein as, respectively, a first direct-drive bicycle training apparatus 10A and a second direct-drive bicycle training apparatus 10B, and the bicycle training apparatus 10C schematically represented in FIG. 4 will be referred to herein as a friction bicycle training apparatus 10C. For the purposes of the description of the system 100 herein, these bicycle training apparatuses 10A, 10B, and 10C may be tested in essentially the same manner and primarily differ only in the manner in which they are coupled to the system 100. Therefore, for convenience the bicycle training apparatuses 10A, 10B, and 10C are at times individually referred to herein simply as a bicycle training apparatus 10 and collectively referred to herein as bicycle training apparatuses 10.

The system 100 includes a frame or base 102 that supports other components of the system 100, a mechanical power generation system with one or more sensors for measuring the power output produced by the mechanical power generation system, a drive train for transferring the mechanical power generated by the mechanical power generation system to the bicycle training apparatus 10, and an arm 104 configured to releasably couple and secure the bicycle training apparatus 10 to the system 100.

In this nonlimiting example, the mechanical power generation system includes a 240 V, three-phase, five horsepower AC motor 106, with a 1740 nameplate rpm. The motor 106 is face-mounted to a gear reducer 108 with a 5:1 worm-gear reduction configured to reduce the power output of the motor 106 (as nonlimiting examples, shaft speeds of 0 to 352 rpm, up to 100 Nm torque, and total power delivery of over 3000 watts). The motor 106 is operated to rotate a main drive shaft 110 coupled to the drive train (discussed below) for imparting power input to the bicycle training apparatus 10. An output of the gear reducer 108 is connected to a torque sensor 112 via a first double flex coupling 114, and an output of the torque sensor 112 is attached to the main drive shaft 110 with a second double flex coupling 116. The main drive shaft 110 may be rotatably fixed to the base 102 with pillow block bearings 118 and may include an attached rotational speed (for example, rpm) sensor 120, such as an optical encoder, for rotational speed measurements (FIGS. 3 through 7).

Figure 3:
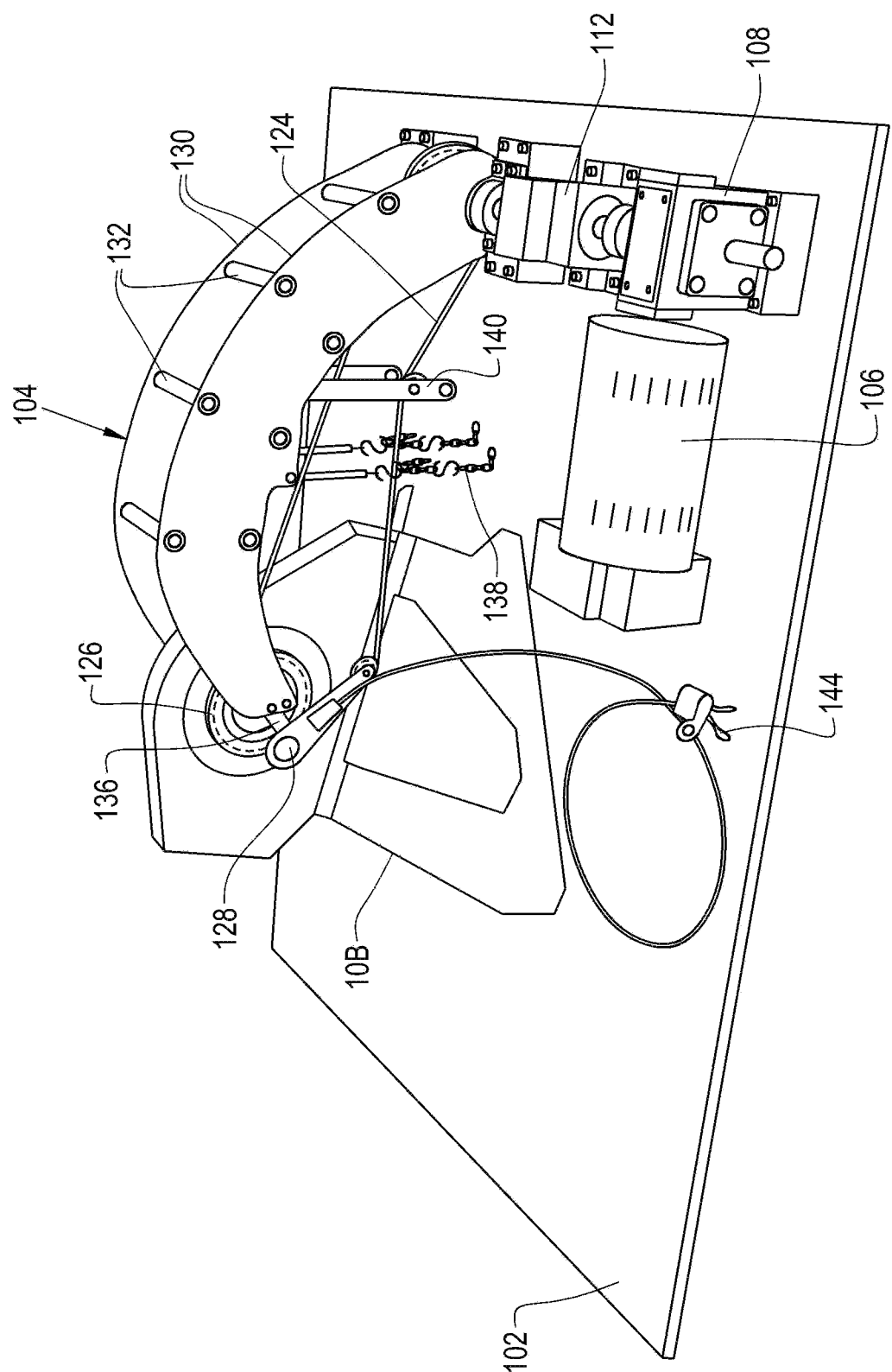
FIG. 3 represents the system of FIGS. 1 and 2 coupled to a second bicycle training apparatus for testing thereof.
Figure 4:
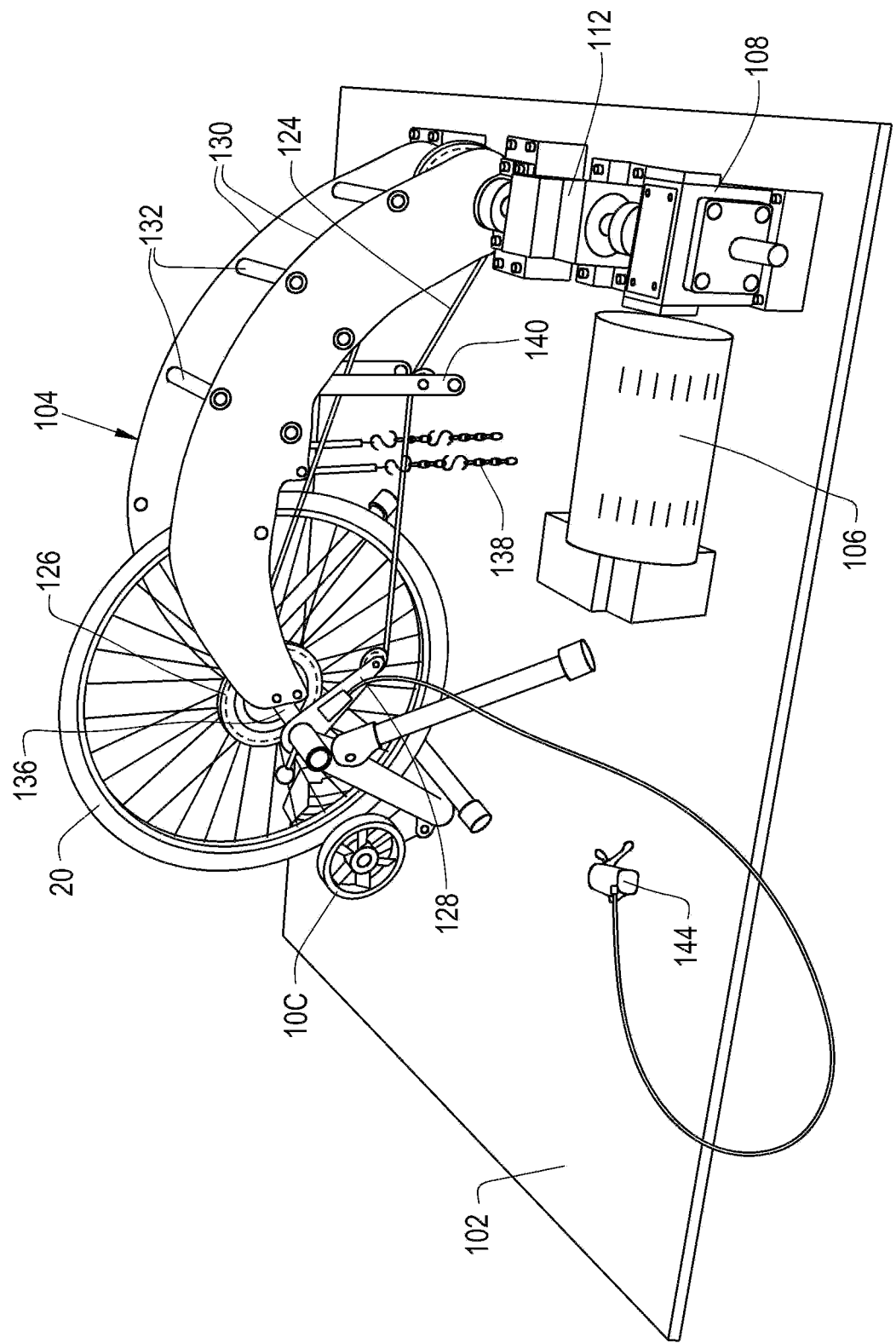
FIG. 4 represents the system of FIGS. 1 and 2 coupled to a wheel in contact with a third bicycle training apparatus for testing thereof.

The drive train is functionally coupled to the main drive shaft 110 and includes one or more sprockets 122 (as a nonlimiting example, a chain ring) that mate with a roller chain 124 (i.e., a bicycle chain). The roller chain 124 extends along a length of the arm 104 and may be functionally and releasably coupled with one or more sprockets 126 (as a nonlimiting example, a cassette) at a distal end thereof opposite the main drive shaft 110. Depending on the type of bicycle training apparatus 10 being tested, the sprocket(s) 126 at the distal end of the arm 104 may be coupled to a hub (or bicycle drive train interface) of the bicycle training apparatus 10 (as nonlimiting examples, the bicycle training apparatus 10A represented in FIG. 1, and the bicycle training apparatus 10B represented in FIG. 3) or to a hub of a bicycle wheel 20 that is in contact with the bicycle training apparatus 10 (as a nonlimiting example, the bicycle training apparatus 10C represented in FIG. 4). With either of these configurations, rotation of the main drive shaft 110 rotates the sprocket(s) 122, thereby transferring mechanical power from the motor 106, through the roller chain 124, to the sprocket(s) 126 at the distal end of the arm 104. Simultaneously, rotation of the sprocket(s) 126 causes rotation of the hub secured thereto. For embodiments that include more than one sprocket 122/126 at either end of the arm 104, corresponding derailleur(s) 128 may be included for switching between the sprockets 122 and/or 126 (FIGS. 3 and 4).

The arm 104 may have various configurations suitable for coupling the system 100 to the bicycle training apparatus 10. In this nonlimiting example, the arm 104 includes a pair of spaced apart sides 130 that are fixed relative to one another with spacers 132. The sides 130 are spaced about by a dimension sufficient to receive portions of the bicycle training apparatus 10 or the bicycle wheel 20 therebetween. Proximal ends of the sides 130 are rotatably coupled concentric to the main drive shaft 110 with bearings 134. This allows the arm 104 to be pivotable relative to the base 102. Distal ends of the sides 130 include dropouts 136 configured to releasably couple with the hub of the bicycle training apparatus 10 or the bicycle wheel 20. The dropouts 136 may be secured to the hub with fasteners, a nonlimiting example, a quick release skewer or through axle, or as in this instance the arm 104 may be secured with a vertical tension member 138. One or both of the proximal end and the distal end of the arm 104 may include a derailleur hanger for supporting a corresponding derailleur 128, if present. Optionally, the arm 104 may include a chain guide 140 for applying tension to and/or positioning the roller chain 124 (FIGS. 3 through 6). Preferably, the base 102, the arm 104, and other relevant components are configured to be rigid to reduce flexing, vibration, and other perturbations that may affect results obtained with the system 100. The arm 104 configuration described herein and represented in the figures provides for testing of a wide variety of bicycle training apparatuses having various geometries.

With the knowledge of the input torque and rotational speed generated by the motor 106, the input power (or "virtual cyclist" power) is explicitly known. The drive train may connect the main drive shaft 110 to the bicycle training apparatus 10 in a manner similar to how a bicycle would be connected, and allows the system 100 to interact with the bicycle training apparatus 10 in a manner similar to a cyclist riding such a bicycle. It is believed that this arrangement provides for control over a sufficient quantity of variables such that the system 100 may be substantially consistent between bicycle training apparatuses, and provides for a testing setup that is essentially the same or similar to real life operation of the bicycle training apparatus 10 by a cyclist riding on a bicycle.

The system 100 may include various other components configured for the operation, control, and monitoring of the system 100 and the bicycle training apparatus 10. The system 100 may include an onboard control and data acquisition systems on the base 102, or configured to physically or wirelessly connect to and communicate with a remote control and data acquisition system, or a combination thereof as represented by an onboard control system 146 and a remote data acquisition system 148 represented in FIG. 7. The control system 146 may be configured to control the operation of the system 100, including the operation of the motor 106. The data acquisition system 148 may be configured to receive data relating to, for example, the operation of the motor 106 and measurements obtained by the torque sensor 112, the rotational speed (rpm) sensor 120, and/or the bicycle training apparatus 10. In certain examples, the data acquisition system 148 may be configured for ANT+FE-C or BTLE FTMS communication with smart bicycle training apparatuses for reading and logging their power output. Optionally, the system 100 may be configured to monitor the temperature and/or humidity of the surrounding ambient air to account for such operating conditions. For improved accuracy, it may be desirable for the system 100 to include an enclosure that encases the entire system 100 during testing to provide for temperature and humidity control. For embodiments that include one or more derailleurs 128, the system 100 may include controls 144 suitable for switching between the corresponding sprockets 122 and/or 126.

The system 100 provides for a method of performing an accuracy verification test on various bicycle training apparatuses. The method may include locating the bicycle training apparatus 10 on the base 102. For a direct-drive bicycle training apparatus (as nonlimiting examples, the bicycle training apparatuses 10A and 10B), the arm 104 may be pivoted such that the dropouts 136 at the distal end thereof couple with the hub of the bicycle training apparatus 10. For roller and friction bicycle training apparatuses (as a nonlimiting example, the bicycle training apparatus 10C), the arm 104 may be pivoted such that the dropouts 136 couple with the hub of the bicycle wheel 20. The arm 104 may be secured on the hub by applying a load on the arm 104 in a direction toward the base 102 with the vertical tension member 138.

Once the bicycle training apparatus 10 has been functionally coupled to the system 100, the motor 106 may be operated to apply the power input to the bicycle training apparatus 10. During the test, the torque sensor 112 measures the torque generated by the motor 106, the rotational speed sensor 120 measures the rotational speed of the main drive shaft 110, and the bicycle training apparatus 10 measures the power input applied thereto by the system 100. These measurement data may be collected and analyzed to determine any discrepancies between the actual power input generated by the motor 106 and measured by the torque sensor 112 and rotational speed sensor 120, and the power recorded by the bicycle training apparatus 10. For certification testing, the bicycle training apparatus 10 may be certified if the discrepancies between the actual power input and the power recorded by the bicycle training apparatus 10 are within a predetermined range. In certain instances, the accuracy verification test may be used during calibration of the bicycle training apparatus 10 wherein the bicycle training apparatus 10 and/or software thereof is adjusted based on the results of the accuracy verification test such that the bicycle training apparatus 10 performs within the predetermined range.

In certain cases, it may be desirable to calibrate the system 100 to account for power transmission losses due to drive train inefficiencies. Without such calibration, the system 100 is capable of measuring relative efficiency between different bicycle training apparatuses 10, but with the addition of calibration to compensate for power transmission losses, much greater accuracy can be achieved. Loss compensation may be determined by performing calibration testing of the system 100.

Figure 2:
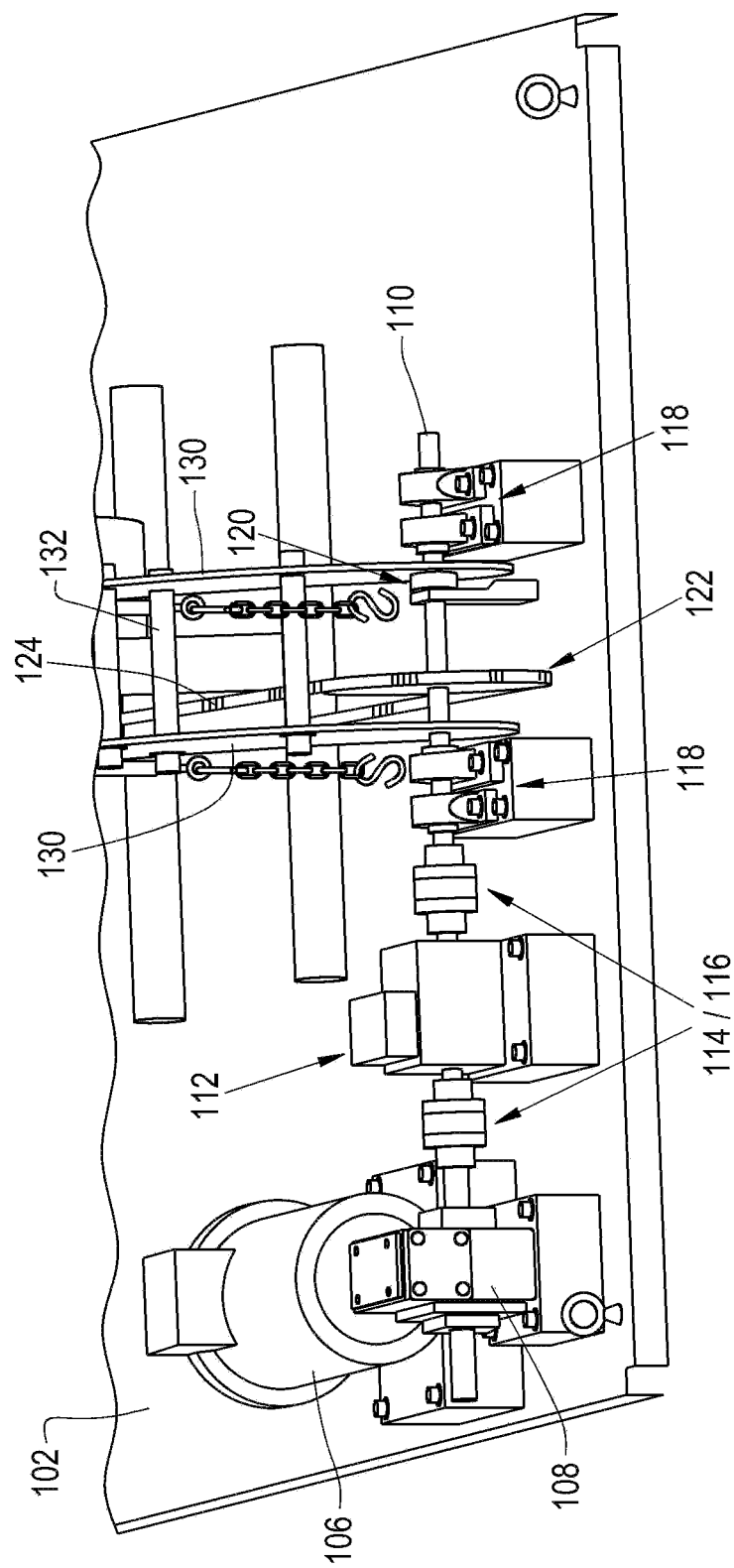
Figure 5:
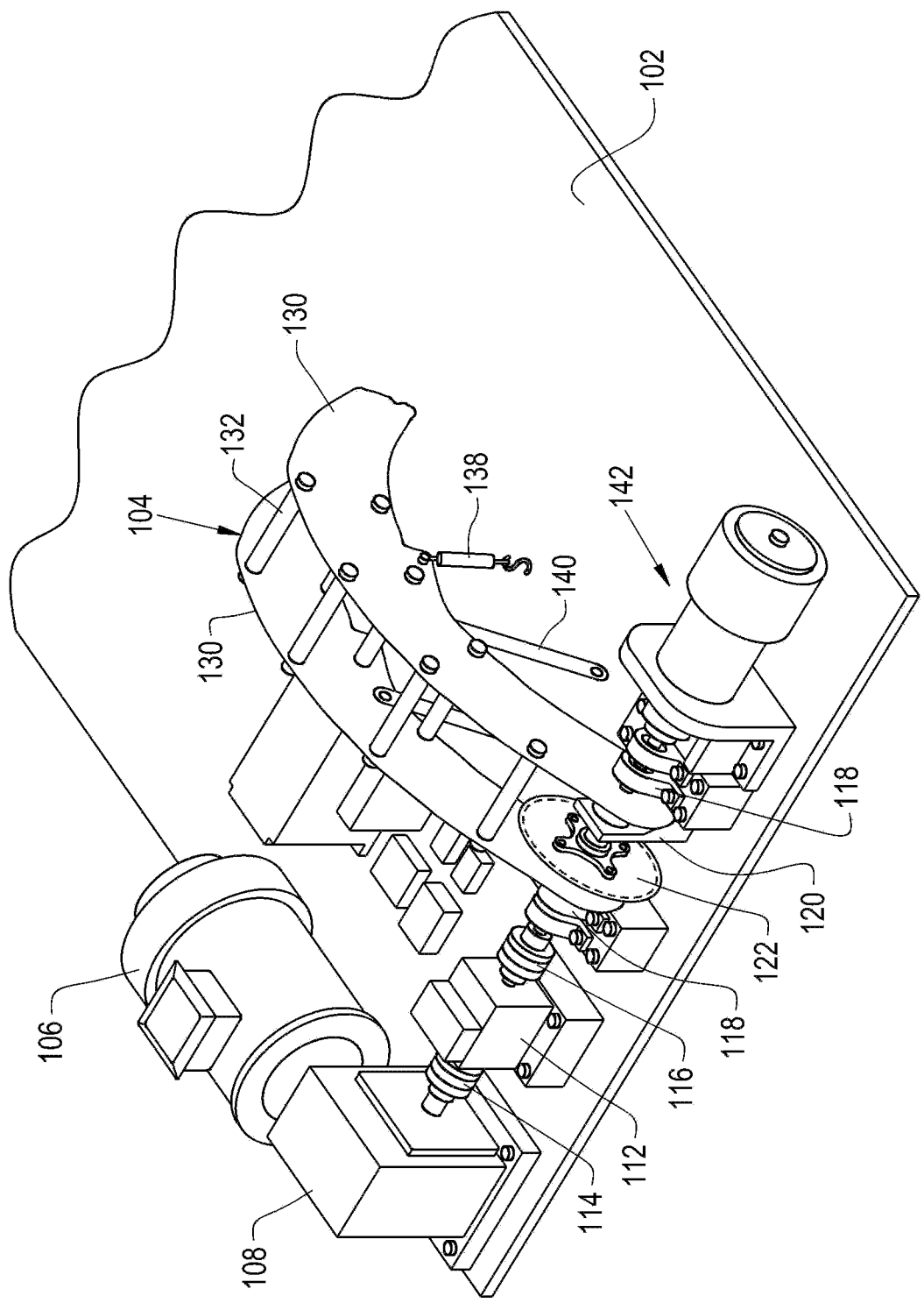
FIGS. 5 and 6 represent two configurations suitable for use in combination to calibrate the system of FIGS. 1 and 2 in accordance with nonlimiting aspects of the invention.
Figure 6:
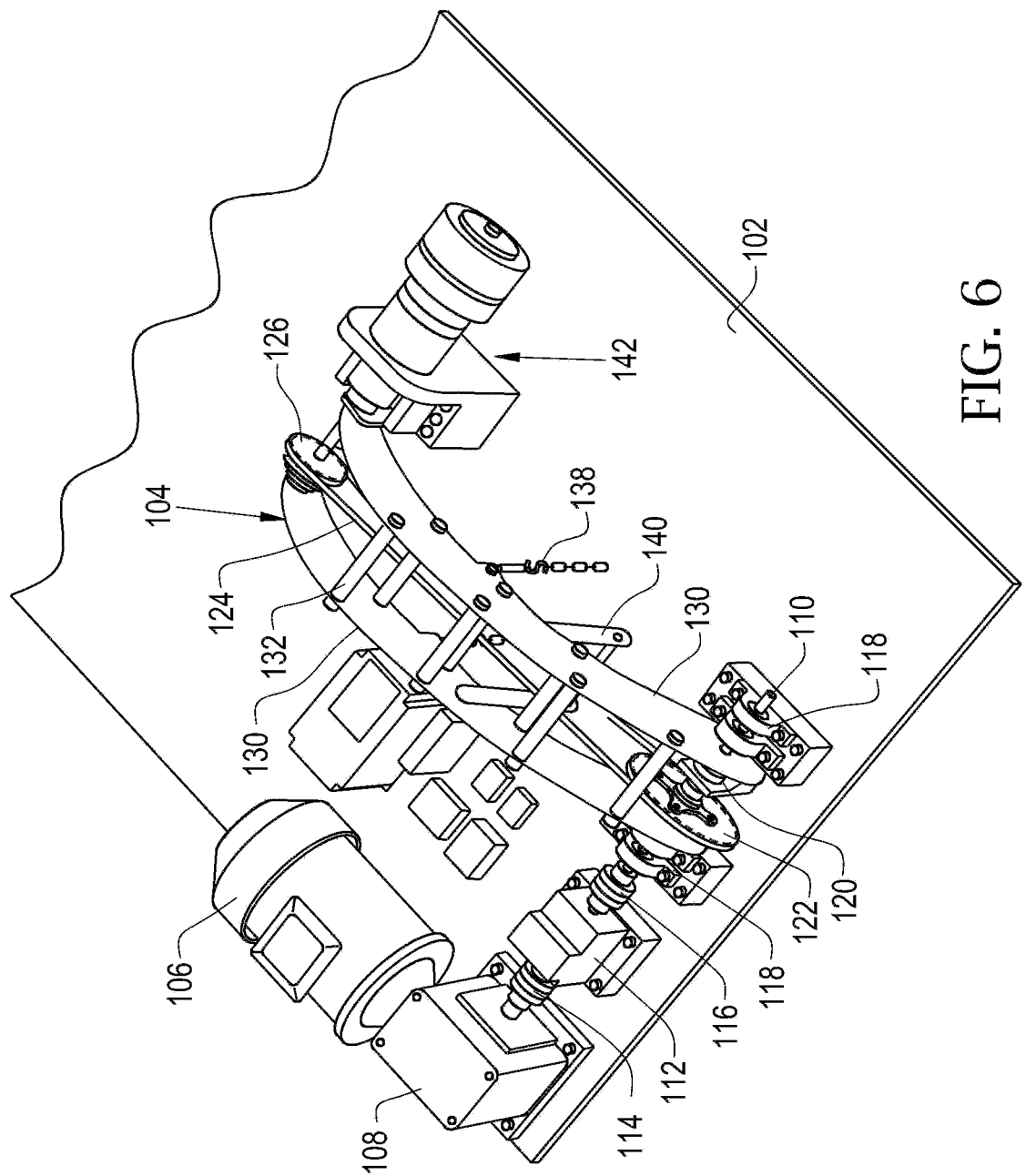

FIGS. 5 and 6 represent first and second configurations utilizing the system 100 of FIGS. 1 and 2 while applying a calibrated brake 142 at two separate locations and then comparing the test results to determine discrepancies. FIG. 5 shows the calibrated brake 142 (as a nonlimiting example, an electromagnetic brake) functionally coupled directly in line with the main drive shaft 110 and the roller chain 124 disconnected from the system 100, and FIG. 6 shows the calibrated brake 142 after being relocated and coupled at the distal end of the arm 104 directly in line with and functionally coupled to the sprocket(s) 126 thereat and the roller chain 124 is replaced. While in the first configuration of FIG. 5, a calibration testing regime may be run in which brake resistance (i.e., a brake force applied by the brake 142) is cycled through a range of values and/or the motor 106 is cycled through a range of main drive shaft 110 rotational speeds (rpm's) while the power input is measured. Thereafter, the brake 142 is relocated as shown in the second configuration of FIG. 6, and a calibration testing regime identical to that previously used in the first configuration is run while the power input is measured.

Figure 7:
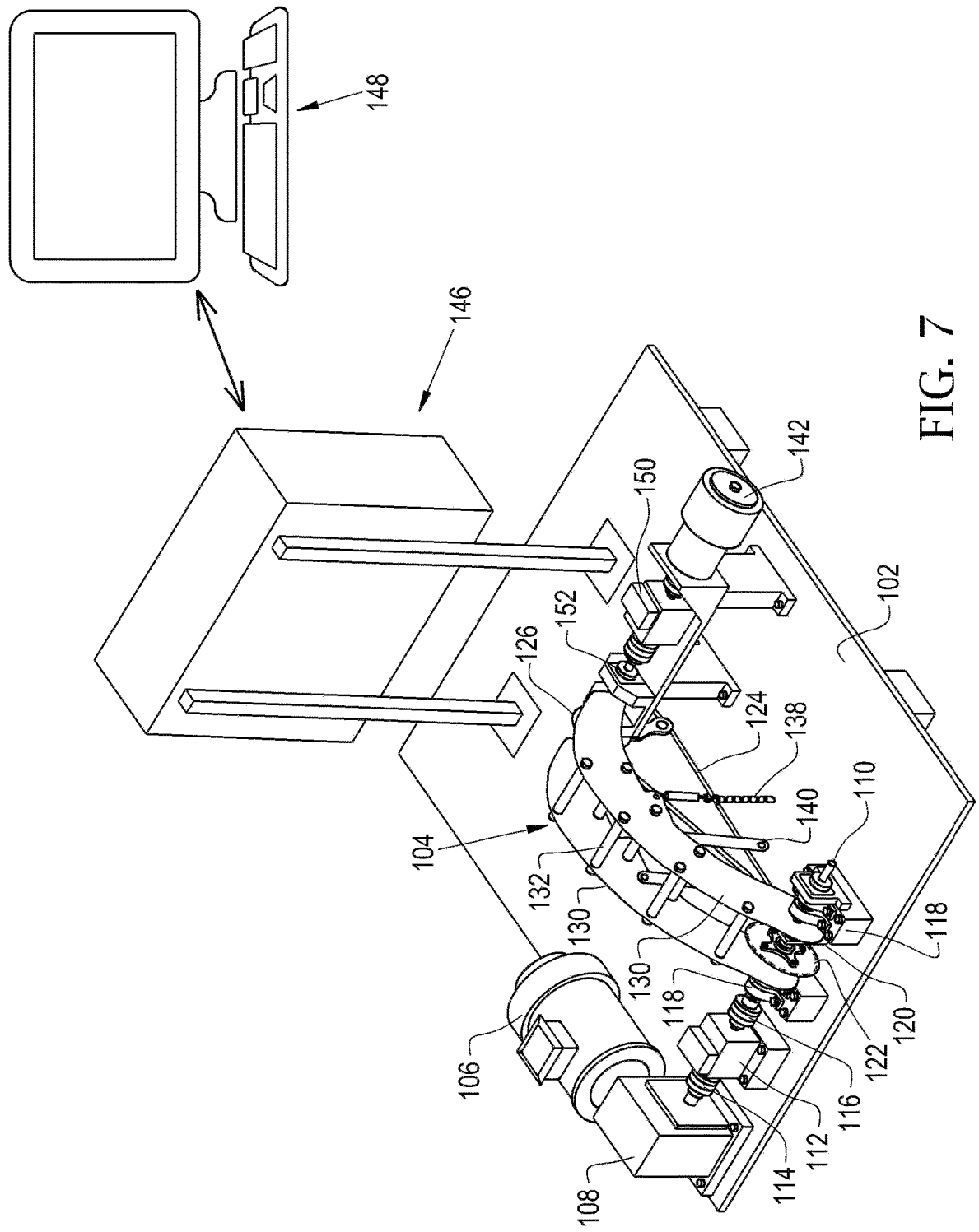
FIG. 7 represents an arrangement suitable for calibrating the system of FIGS. 1 and 2 in accordance with another nonlimiting aspect of the invention.
Figure 8:
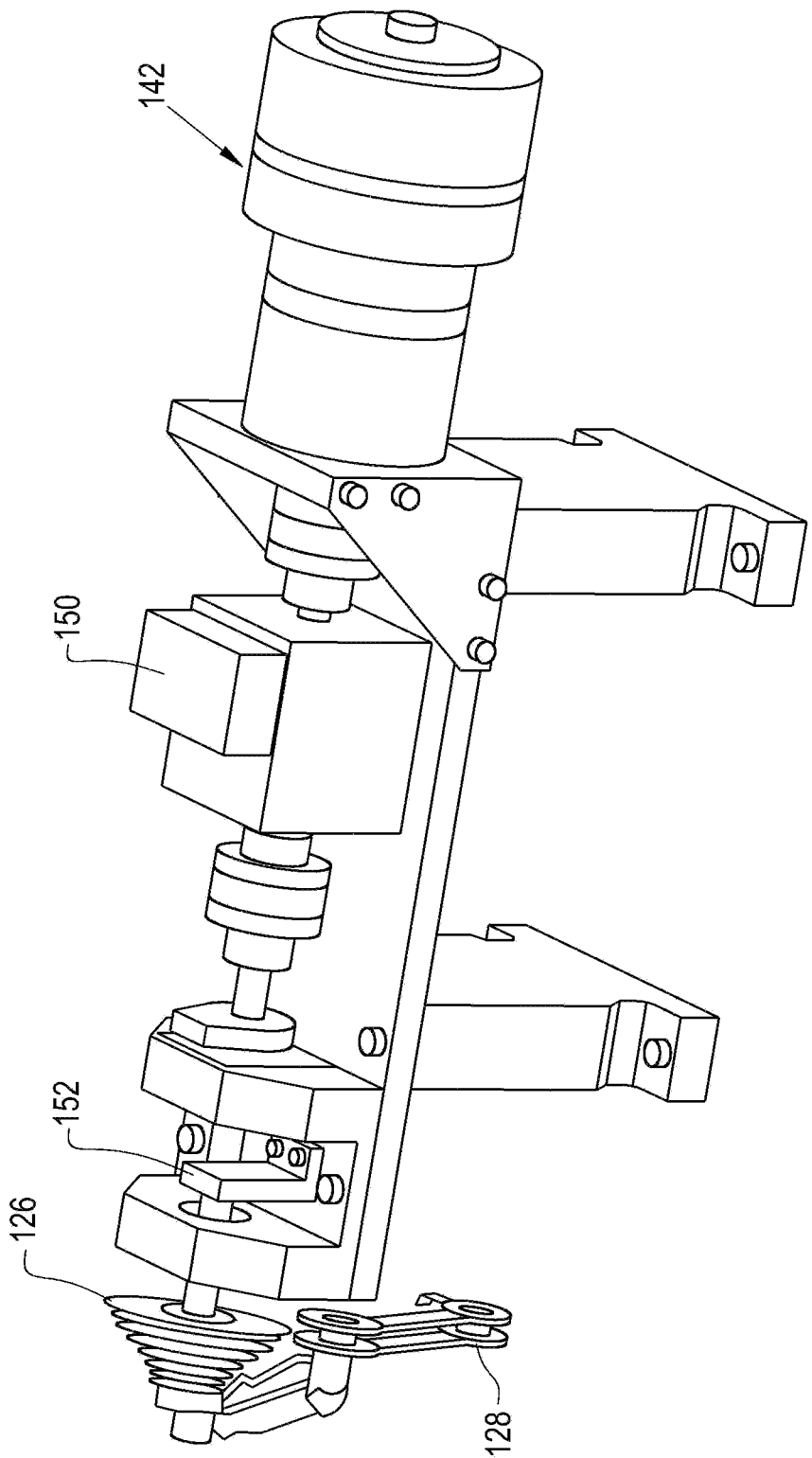
FIG. 8 represents a unit comprising a brake, torque sensor, and rotational speed sensor used in the arrangement represented in FIG. 7.

FIG. 7 is an alternative arrangement in which, similar to FIG. 6, the calibrated brake 142 is coupled at the distal end of the arm 104 directly in line with and functionally coupled to the sprocket(s) 126 and the roller chain 124 is in place. With the arrangement of FIG. 7, a simplified calibration testing regime may be run as compared to that of the first and second configurations of FIGS. 5 and 6. As an example, power transmission loss is calibrated through running a series of tests spanning various speeds and torques while the calibrated brake 142 remains connected directly in line with the sprocket(s) 126. During the series of tests, the input torque is measured by the torque sensor 112, output torque is measured by a second torque sensor 150 coupled in line with the brake 142, the measured input and output torques are compared, and the ensuing power transmission loss is calculated. FIG. 7 also incorporates a second rotational speed sensor 152, with the result that there are the torque sensor 112 and rotational speed sensor 120 between the motor 106 and chain 124, and there are the second torque sensor 150 and second rotational speed sensor 152 between the chain 124 and brake 142, which enables the difference in power before and after the chain 124 to be determined without moving the brake 142. A calibration testing regime may be performed with the arrangement of FIG. 7 by cycling brake resistance (i.e., a brake force applied by the brake 142) through a range of values and/or the motor 106 is cycled through a range of main drive shaft 110 rotational speeds (rpm's) while the power input is measured and simultaneously the power output (after going through the chain 124) is measured via the second torque and rotational speed sensors 150 and 152.

For a given brake torque, the motor 106 must supply more power to achieve a required shaft angular velocity after the chain 124 in order to overcome power transmission losses due to drive train inefficiencies. Therefore, simultaneous measurement data obtained from the power input versus the power output after the chain 124 may be analyzed to determine losses in the drive train (as nonlimiting examples, the roller chain 124, sprockets 122/126, derailleur(s) 128, etc.) by comparing the power input required before the chain 124 and the power output after the chain 124. The determined difference in power required is equal to the loss due to the drive train inefficiency. This determined loss can then be used as a predetermined loss offset of power delivered to the bicycle training apparatus 10 during accuracy verification tests. By applying this offset, the power input into the bicycle training apparatus 10 can be measured in absolute terms. In some cases, this offset may be applied in software associated with the accuracy verification testing. It should be noted that the loss due to drive train inefficiency is heavily dependent on the tension of the chain 124, which is in turn dependent on the speed and power of the motor 106. Therefore, it may be desirable to determine the loss offset at each of the accuracy verification testing conditions used for the bicycle training apparatus 10. In certain examples, the drive train losses may be calibrated up to or in excess of 1000 W.

Power transmission loss values acquired as described above can be used during subsequent testing of a bicycle training apparatus 10 to assure that the power input into the bicycle training apparatus 10 has power transmission losses accounted for and thus accuracy of the entire system 100 is enhanced. Measurements are represented in FIG. 7 as being transmitted to the data acquisition system 148 on which a virtual cycling program can operate.

In addition to the absolute and/or relative steady state accuracy, other parameters of the bicycle training apparatus 10 may be evaluated using the system 100. As nonlimiting examples, acquired data may be used to determine a time delay of the bicycle training apparatus response to power input and control input, inertia for rider inertia simulation, resistance curves, temperature effects, comparisons between different bicycle training apparatuses, and spider-based power meter testing.

To measure time delay, the system 100 may be controlled to change from a first operating condition to a second operating condition (as a nonlimiting example, by increasing the rotational speed). The system 100 and the bicycle training apparatus 10 may then be monitored to determine the time necessary for each to achieve a predetermined threshold, such as the second operating condition or a percentage thereof (as a nonlimiting example, 95% of the second operating condition). The difference between the time necessary for the system 100 to achieve the predetermined threshold and the time necessary for the bicycle training apparatus 10 to achieve the predetermined threshold may be considered the time delay of the bicycle training apparatus 10.

The work done by both the system 100 and the bicycle training apparatus 10 during the transient period between the first and second operating conditions is another metric that may be used to quantify step response of the bicycle training apparatus 10. Again, the power reported by the bicycle training apparatus 10 should be scaled by the drive train inefficiency. The work calculated for the system 100 and the bicycle training apparatus 10 may be used to calculate a value for the accuracy of the transient response of the bicycle training apparatus 10.

In order to promote the likelihood that various bicycle training apparatuses operate within acceptable accuracy ranges, the system 100 should be used to examine a range of conditions that might arise during normal use of the bicycle training apparatus 10. This may include steady state accuracy at a variety of wheel speeds and resistances of the bicycle training apparatus 10, as well as accuracy in wheel speed and resistance step responses of the bicycle training apparatus 10.

A nonlimiting exemplary accuracy verification test may include a series of tests wherein the system 100 and the bicycle training apparatus 10 are monitored at various predetermined and constant operating parameters such as wheel speeds of 60, 90, and 120 rpm each at gradients of 0, 5, 10, 15, 20, and 25 percent (as nonlimiting examples, 60/0, 90/0, 120/0, 60/5, 90/5, etc.). Wheel speed is referenced here rather than cadence because wheel speed is independent of gear ratio. The discrepancies between the system 100 and the bicycle training apparatus 10 may be used to determine a steady state power accuracy of the bicycle training apparatus 10.

The power input cadence step response accuracy of the bicycle training apparatus 10, that is, the difference in work done or time delay, may be determined with a series of tests wherein the gradient is constant but the wheel speed changes during the course of each test. As nonlimiting examples, tests can be performed with gradients of 0, 5, 10, 15, 20, and 25 percent, each with wheel speed changes of 60 to 90 rpm, 90 to 120 rpm, 120 to 90 rpm, and 90 to 60 rpm.

The resistance step response accuracy of the bicycle training apparatus 10, that is, the difference in work done or time delay, may be determined with a series of tests wherein the wheel speed is constant but the gradient changes during the course of each test. As nonlimiting examples, tests can be performed with wheel speeds of 60, 90, and 120 rpm, each with gradient changes of 0 to 5 percent, 5 to 10 percent, 10 to 15 percent, 15 to 10 percent, 10 to 5 percent, and 5 to 0 percent.

While testing the bicycle training apparatus 10 with the system 100, small deviations in the measurements at low wattage (as a nonlimiting example, 10 W) may result in errors. Therefore, it may be desirable to allow for a margin of error. As a nonlimiting example, for testing performed with the system 100 in a range of 100 to 2000 W, margins of error may be permitted such as within about two percent for steady state accuracy, and within about five percent for accuracy in wheel speed and trainer resistance step responses.

Alternative embodiments are contemplated in addition the embodiments(s) shown and/or described herein. As a non-limiting example, the system 100 may be configured to apply the power input directly to the bicycle training apparatus 10 or the wheel 20 rather than via the drive train. As a nonlimiting example, the torque sensor 112 may be coupled to the hub of the bicycle training apparatus 10 rather than the main drive shaft 110. In yet another configuration, a torque tube or shear disc torque sensor could be mounted to the hub of the bicycle training apparatus 10 and a roller chain- or a belt-based drive train could be used to drive the torque tube or the shear disc torque sensor.

Although the system 100 has been described in relation to bicycle training apparatuses, it is also within the scope of the invention that the system 100 may be used for testing certain stationary bicycles. As a nonlimiting example, various commercially available models of stationary bicycles could be modified by removing a crank arm thereof and replacing this component with a custom sprocket configured to functionally mate with the drive train of the system 100. In such embodiments, the same testing may be performed on the stationary bicycles as on the bicycle training apparatuses.

While the invention has been described in terms of specific embodiments, it is apparent that other forms could be adopted by one skilled in the art. For example, the physical configuration of the system 100 could differ from that shown, and materials and processes/methods other than those noted could be used. In addition, the invention encompasses additional embodiments in which one or more features or aspects of different disclosed embodiments may be combined. Therefore, the scope of the invention is to be limited only by the following claims.

The invention claimed is:

1. A system for testing the accuracy of a bicycle training apparatus that is configured to measure the power output of a cyclist riding on a bicycle, the system comprising:
    a base;
    a main drive shaft secured to the base;
    a motor secured to the base and configured to rotate the main drive shaft;
    a torque sensor configured to measure the torque applied to the main drive shaft during rotation thereof;
    a rotational speed sensor configured to measure the rotational speed of the main drive shaft during rotation thereof;
    means for securing the bicycle training apparatus relative to the base; and
    means for coupling the main drive shaft to a hub of the bicycle training apparatus or a hub of a bicycle wheel in contact with the bicycle training apparatus.

2. The system of claim 1, wherein the main drive shaft is directly coupled to the hub of the bicycle training apparatus or the hub of the bicycle wheel in contact with the bicycle training apparatus.

3. The system of claim 1, further comprising a drive train configured to transfer mechanical power from the main drive shaft to the hub of the bicycle training apparatus or the hub of the bicycle wheel in contact with the bicycle training apparatus.

4. The system of claim 3, wherein the drive train comprises at least a first sprocket secured to the main drive shaft and configured to rotate therewith, at least a second sprocket configured to couple with the hub of the bicycle training apparatus or the hub of the bicycle wheel in contact with the bicycle training apparatus and cause rotation thereof in response to rotation of the second sprocket, and a roller chain coupling the first sprocket and the second sprocket such that the second sprocket rotates in response to rotation of the first sprocket.

5. The system of claim 4, further comprising a chain guide configured to apply tension to the roller chain and/or position the roller chain.

6. The system of claim 4, wherein the first sprocket is one of at least two sprockets of a chain ring and the system comprises a derailleur configured to switch the roller chain between the sprockets of the chain ring.

7. The system of claim 4, wherein the second sprocket is one of at least two sprockets of a cassette and the system comprises a derailleur configured to switch the roller chain between the sprockets of the cassette.

8. The system of claim 1, further comprising an arm having a proximal end pivotally coupled relative to the base and a distal end configured to releasably secure to the hub of the bicycle training apparatus or the hub of the bicycle wheel in contact with the bicycle training apparatus, and a vertical tension member configured to apply a load to the arm in a direction toward the base that is sufficient to retain the arm and the bicycle training apparatus or the bicycle wheel in fixed positions relative to the base.

9. The system of claim 8, wherein the arm comprises a pair of sides with spacers therebetween, wherein the sides are spaced apart to an extent sufficient to receive therebetween at least a portion of the bicycle training apparatus or the bicycle wheel.

10. A method for testing the accuracy of a bicycle training apparatus that is configured to measure the power output of a cyclist riding on a bicycle, the method comprising:
    locating the bicycle training apparatus on a base of a system;
    securing the bicycle training apparatus relative to the base;
    coupling a main drive shaft of the base to a hub of the bicycle training apparatus or a hub of a bicycle wheel in contact with the bicycle training apparatus;
    operating a motor of the system to rotate the main drive shaft and apply a power input to the bicycle training apparatus in response to rotation of the main drive shaft;
    continuously measuring the torque and the rotational speed of the main drive shaft with sensors of the system and storing the resulting measurements as a first data set;
    measuring the power input with the bicycle training apparatus and storing the resulting measurements as a second data set; and
    comparing the first data set and the second data set to determine the accuracy of the bicycle training apparatus.

11. The method of claim 10, wherein the main drive shaft is directly coupled to the hub of the bicycle training apparatus or the hub of the bicycle wheel in contact with the bicycle training apparatus.

12. The method of claim 10, further comprising transferring mechanical power from the main drive shaft to the hub of the bicycle training apparatus or the hub of the bicycle wheel in contact with the bicycle training apparatus with a drive train of the system located therebetween.

13. The method of claim 12, wherein the drive train comprises at least a first sprocket secured to the main drive shaft and configured to rotate therewith, at least a second sprocket configured to couple with the hub of the bicycle training apparatus or the hub of the bicycle wheel in contact with the bicycle training apparatus and cause rotation thereof in response to rotation of the second sprocket, and a roller chain coupling the first sprocket and the second sprocket such that the second sprocket rotates in response to rotation of the first sprocket.

14. The method of claim 13, further comprising applying tension to the roller chain and/or positioning the roller chain with a chain guide of the system.

15. The method of claim 12, wherein comparing the first data set and the second data set to determine the accuracy of the bicycle training apparatus includes accounting for losses in power transmission due to drive train inefficiency.

16. The method of claim 12, wherein the first sprocket is one of at least two sprockets of a chain ring and the method further comprises switching the roller chain between the sprockets of the chain ring with a derailleur.

17. The method of claim 12, wherein the second sprocket is one of at least two sprockets of a cassette and the method further comprises switching the roller chain between the sprockets of the cassette with a derailleur.

18. The method of claim 10, wherein securing the bicycle training apparatus to the base comprises:
pivoting an arm of the system relative to the base such that dropouts at the distal end thereof couple with the hub of the bicycle training apparatus or the hub of the bicycle wheel in contact with the bicycle training apparatus; and
applying a load to the arm in a direction toward the base with a vertical tension member that is sufficient to retain the arm and the bicycle training apparatus or the bicycle wheel in fixed positions relative to the base.

19. The method of claim 18, wherein the arm comprises a pair of sides with spacers therebetween and the method further comprises locating at least a portion of the bicycle training apparatus or the bicycle wheel between the sides.

20. The method of claim 10, further comprising providing a certification for the bicycle training apparatus if the accuracy of the bicycle training apparatus is determined to be within a predetermined range.

\* \* \* \* \*